March 30, 1926.

J. MOORES 1,578,905

DOUGH DEPOSITING DEVICE

Filed Dec. 7, 1922   6 Sheets-Sheet 1

Inventor
JOEL MOORES

By Walter F. Murray
Attorney

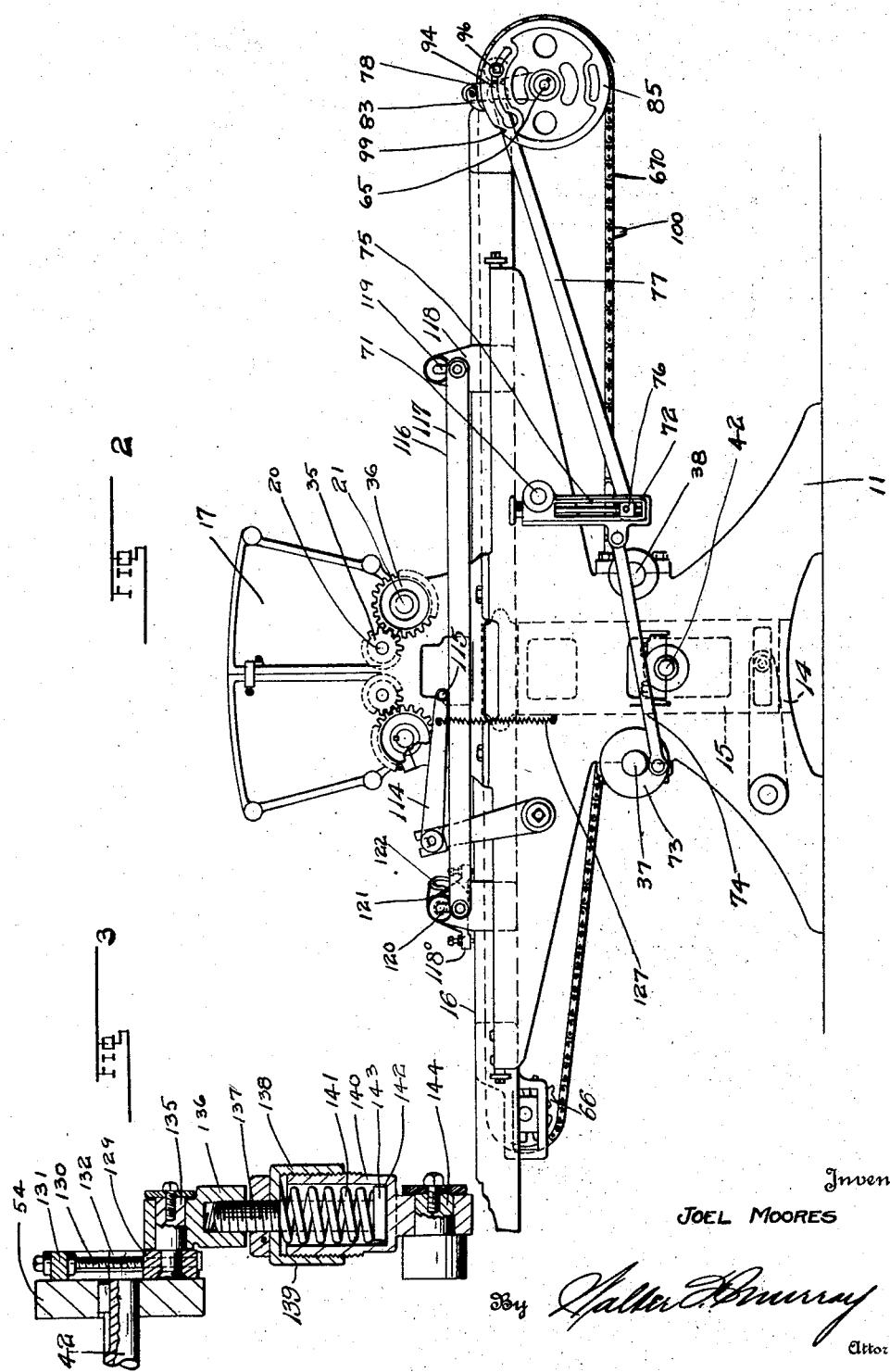

March 30, 1926. 1,578,905
J. MOORES
DOUGH DEPOSITING DEVICE
Filed Dec. 7, 1922 6 Sheets-Sheet 3
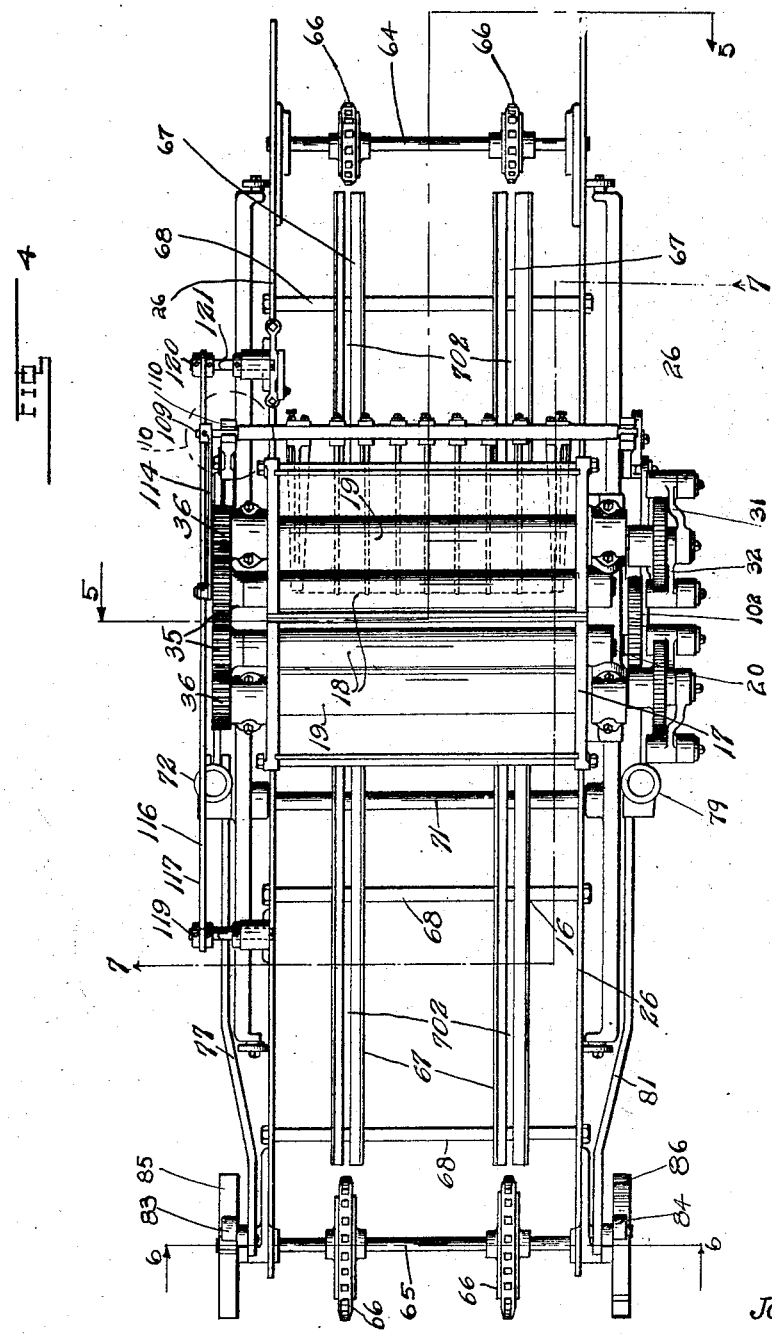
Inventor
JOEL MOORES
By (signature)
Attorney

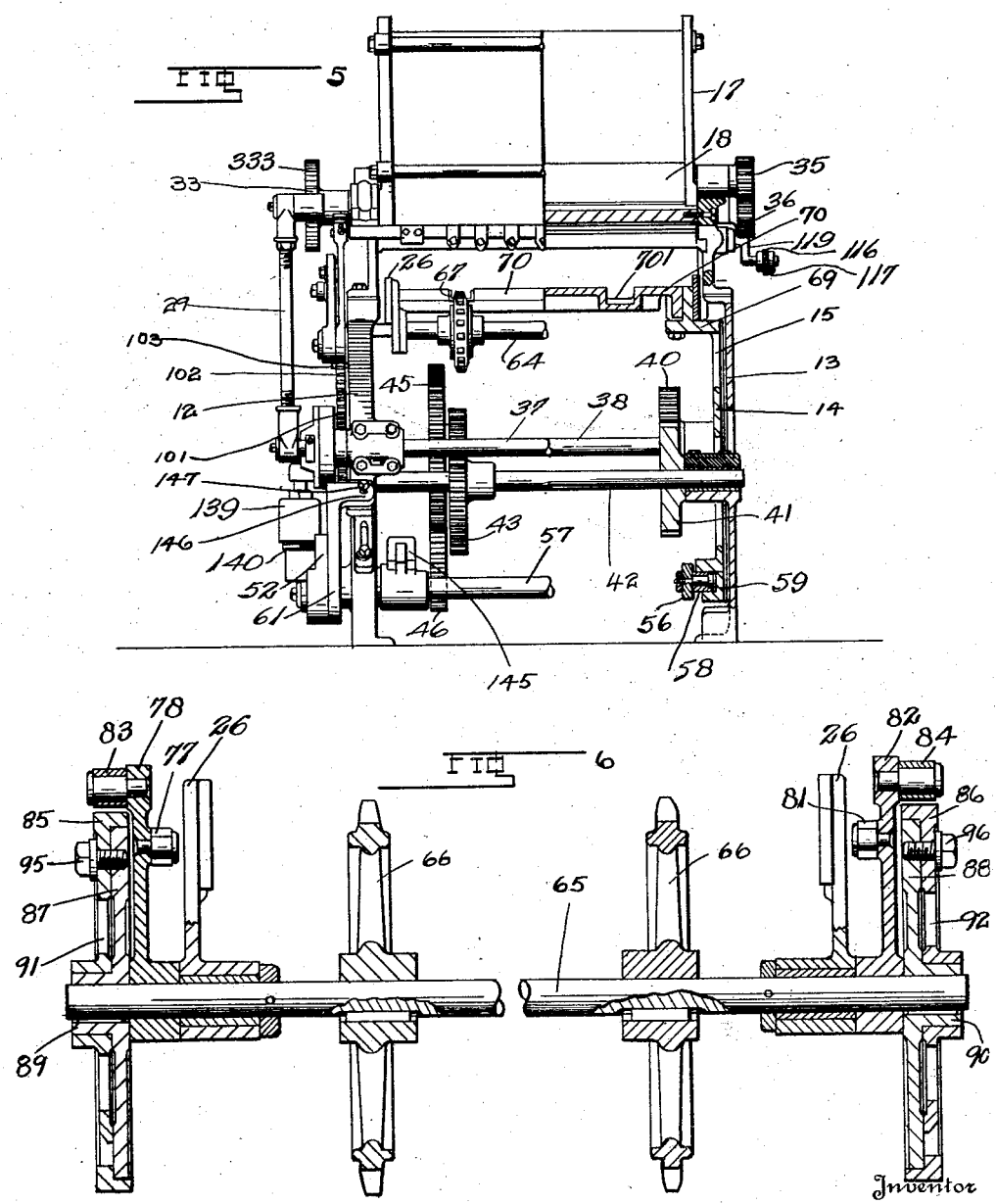

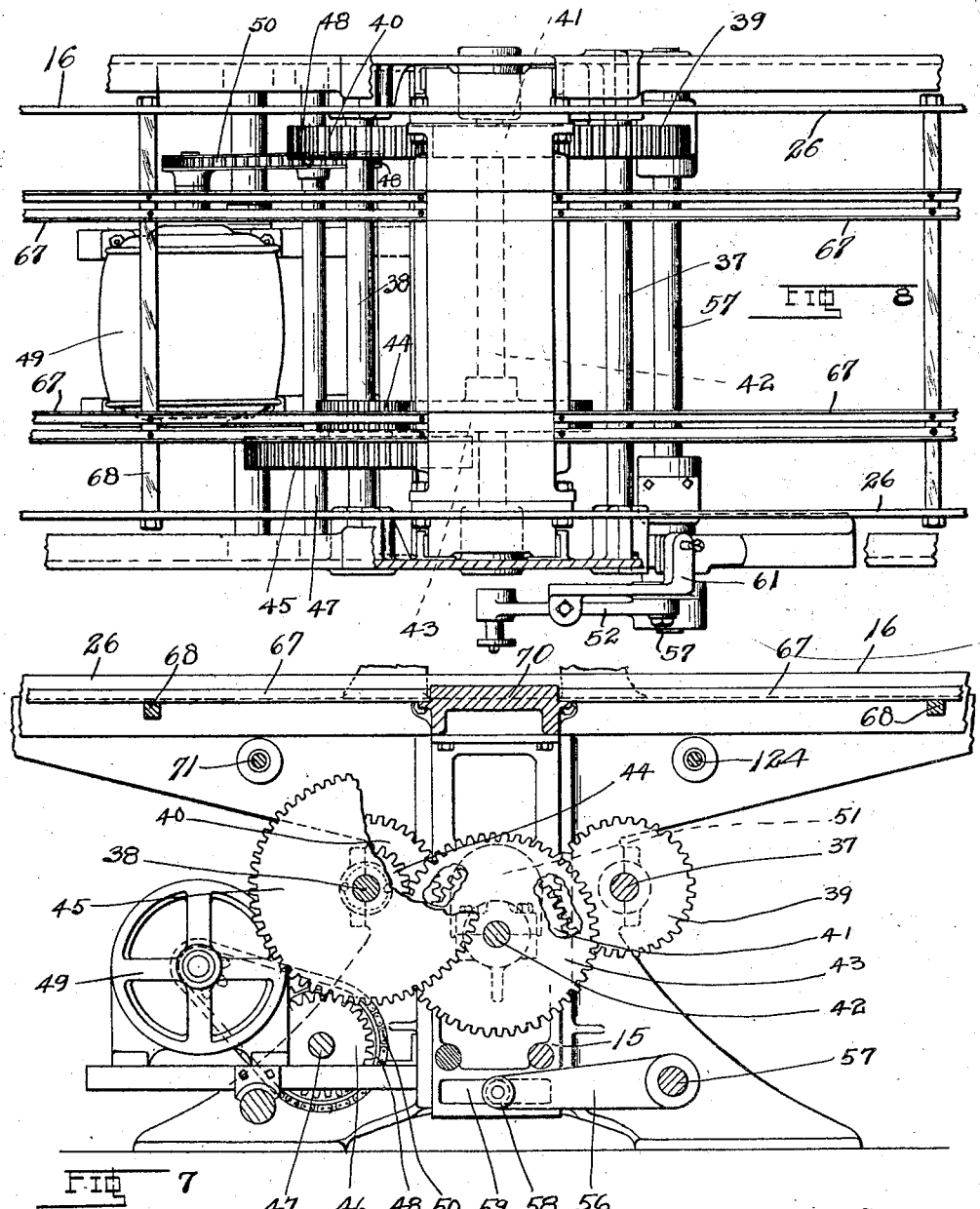

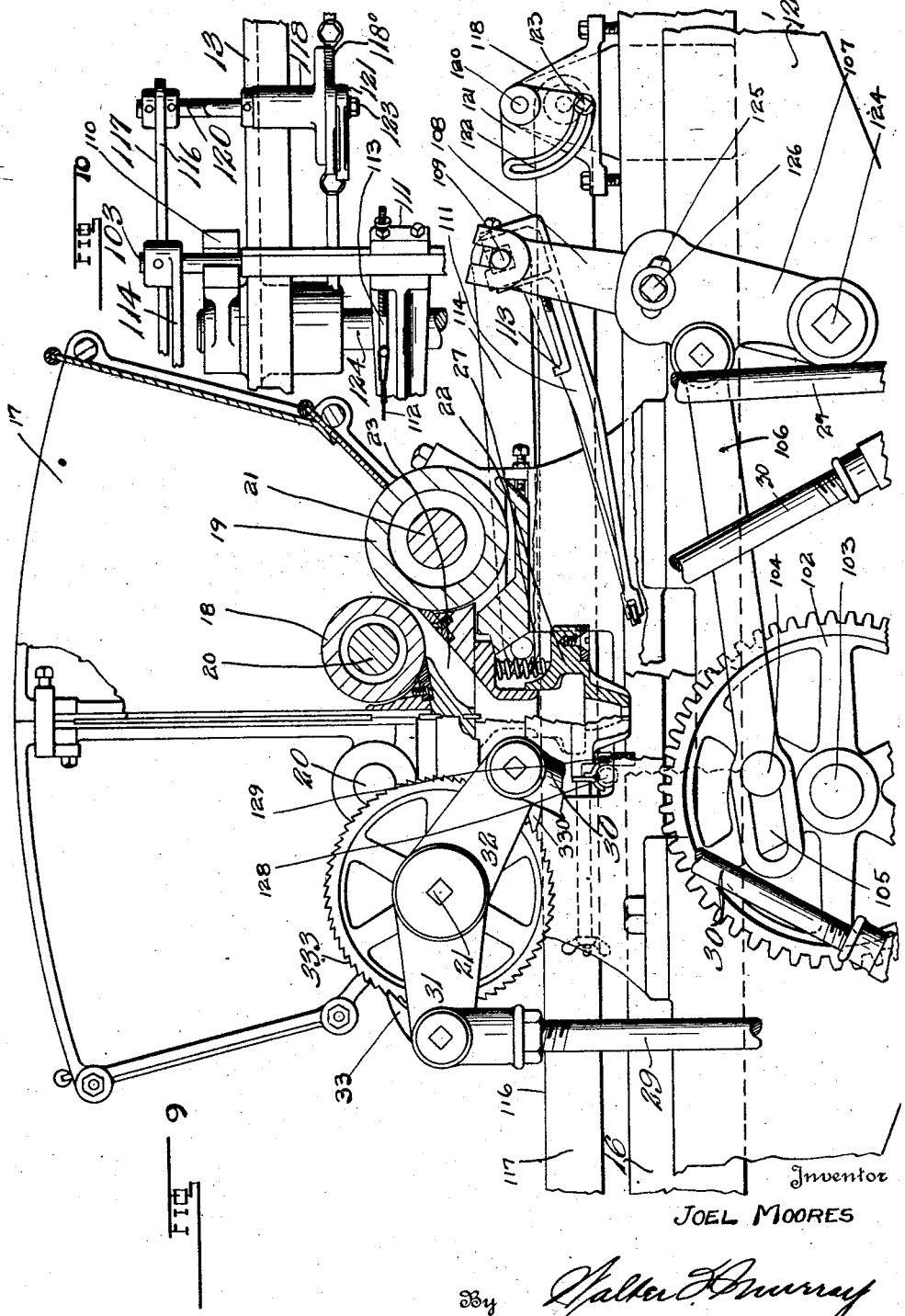

Patented Mar. 30, 1926.

1,578,905

UNITED STATES PATENT OFFICE.

JOEL MOORES, OF CINCINNATI, OHIO, ASSIGNOR TO THE J. H. DAY COMPANY, OF CINCINNATI, OHIO, A CORPORATION OF OHIO.

DOUGH-DEPOSITING DEVICE.

Application filed December 7, 1922. Serial No. 605,412.

*To all whom it may concern:*

Be it known that I, JOEL MOORES, a citizen of the United States of America, and a resident of Cincinnati, in the county of Hamilton and State of Ohio, have invented a new and useful Improvement in a Dough-Depositing Device, of which the following is a specification.

My invention relates to improvements in cake and other machines for depositing and cutting plastic materials.

An object of my invention is to provide a device for making and cutting deposits of dough and other plastic consistency, for example, such as the dough from which coconut taffy and the like are made.

Another object of my invention is to provide a device for the purpose stated provided with means for positively severing the individual deposits of dough from the die employed in making such deposits.

Another object of my invention is to provide means for retaining the severing means in a condition that will assure the highest efficiency in operation of such severing means.

Another object of my invention is to provide a simple and efficient device for the purposes stated.

These and other objects are attained by means described herein and disclosed in the accompanying drawings, in which, Fig. 1 is a side elevation of a device embodying my invention.

Fig. 2 is a side elevation of a device embodying my invention, showing the side of the device opposite to that disclosed in Fig. 1.

Fig. 3 is an enlarged sectional view on line 3—3 of Fig. 1.

Fig. 4 is a plan view of the device shown in Fig. 1.

Fig. 5 is a sectional view on line 5—5 of Fig. 4.

Fig. 6 is an enlarged sectional view on line 6—6 of Fig. 4.

Fig. 7 is an enlarged fragmental sectional view on line 7—7 of Fig. 4.

Fig. 8 is a plan view of parts shown in Fig. 7.

Fig. 9 is an enlarged fragmental side elevation of the device shown in Fig. 1, parts being broken away.

Fig. 10 is an enlarged detailed view of parts designated 10 in Fig. 4.

Figure 1:
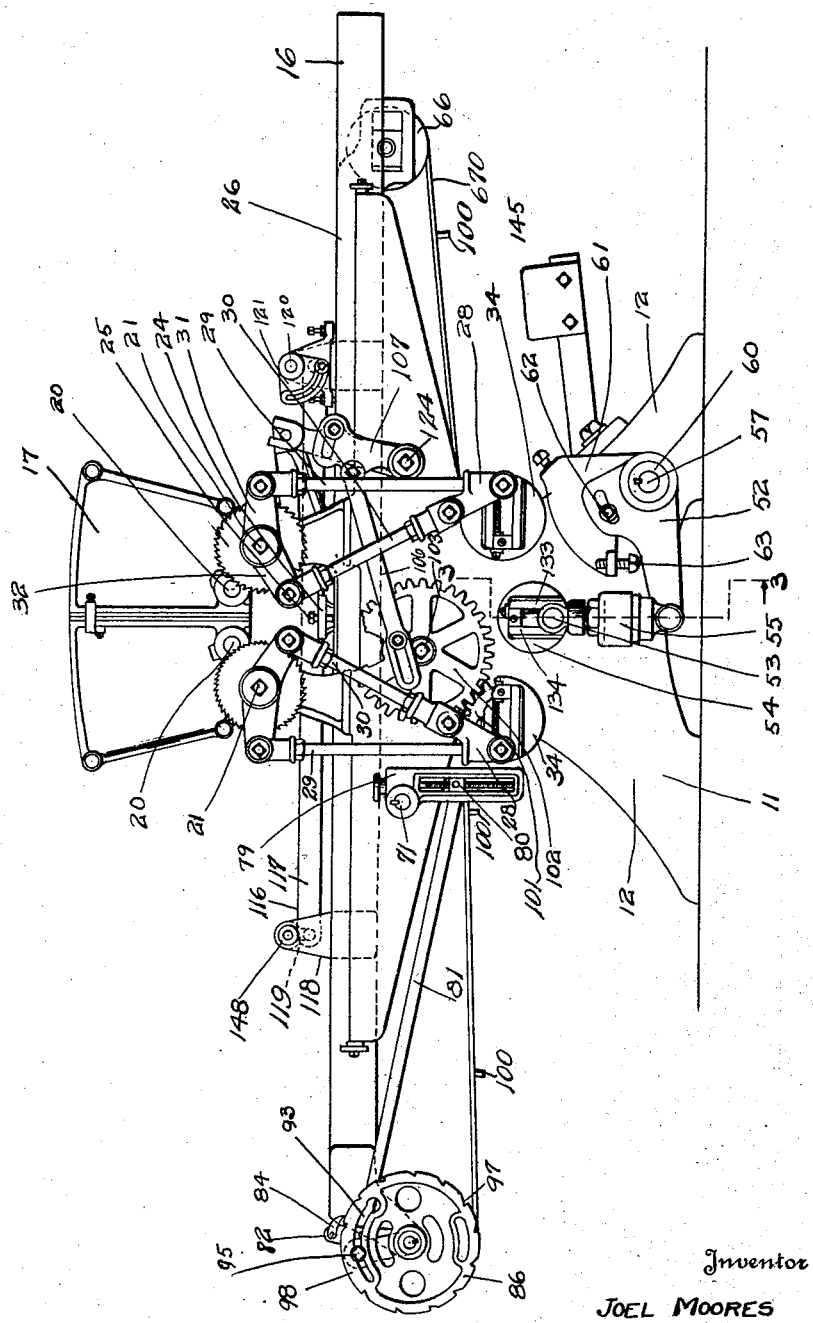

The base 11 comprises sides 12 and 13 having formed in their inner surfaces, ways 14, in which ways are reciprocally mounted slides 15 supporting a reciprocating table 16 extending longitudinally of the device. The table 16 comprises cross piece 70 having grooves 701 carried by brackets 69 formed at the upper ends of slides 15, sides or rails 26 and tracks or rails 67 held between the sides 26 by cross bars 68. The grooves 701 in cross piece 70 register with ways 702 in tracks 67 and provide therewith continuous ways through which endless chains 670 move. Above the table and carried by the sides is a hopper 17 from the lower portion of which dough is fed by means of suitable dough feeding mechanism comprising rollers 18 and 19 mounted on shafts 20 and 21, and a suitable die mechanism 22 communicating with a way 23 into which way the rollers 18 and 19 are adapted to move dough contained within the hopper. The die and die operating mechanism may be of any suitable construction for this purpose. The die and die mechanism disclosed herein comprises a cross plate 24 carrying at its opposite ends adjustable bolts 25, the lower ends of the bolts being adapted to engage the rails 26 forming the sides of the table 16, wherefore the upward movement of the table may be imparted to the die. Springs 27 yieldingly retain the die in its lower most position, and yieldingly resist the upward movement of the table when the bolts 24 are in engagement upon the rails 26 of the table. Rotatory motion is imparted to the shafts 21 by means of double acting ratchet mechanisms comprising sockets 28 carrying bars 29 and 30, which bars are pivotally connected with arms 31 and 32 carrying pawls 33 and 330 operative upon the ratchet wheels 333. The sockets 28 are capable of eccentric mounting upon plates 34, revolubly mounted upon the base, and the pawls carried by the arms 31 and 32 are so disposed that when one pawl is operating upon the ratchet wheel, the other pawl is sliding thereover. The shafts 20 are driven from the shafts 21 by any suitable means such as the meshing gears 35 and 36 mounted upon such shafts. The plates 34 are mounted upon shafts 37 and 38 extending between the sides of the device. The sockets 28 are adjustable radially of the plates 34 whereby to permit modification of the feed of the rollers 19 and 20. The shafts 37 and 38 carry gears 39 and 40 engaging a gear 41 mounted on the transverse shaft 42. The gears 39, 40 and 41 are of the same size. The shaft 42 carries a second gear 43 in mesh with a gear 44 revolubly mounted on shaft 38 and secured to a gear 45. The gear 45 is in mesh with a gear 46 carried by the shaft 47, the shaft 47 carrying a sprocket 48 driven from the motor 49 by any suitable means such as the chain 50. The slides 15 are provided with suitable apertures or cut-out portions 51 to permit reciprocation of the slides without interference with the shaft 42. The slides 15 are reciprocated by means of a bell crank lever 52 having one of its arms pivotally connected by means of an adjustable link structure 55 with a radially adjustable block 53 carried by the plate 54 mounted on the shaft 42. The bell crank lever 52 is revolubly mounted on a collar 60, the collar 60 being keyed to the shaft 57 extending thru the sides of the device. The collar 60 carries a block 61 to which the arm of the bell crank lever 52 may be attached by means of a suitable bolt 62. A second bolt 63 carried by the block 61 permits relative adjustment of the lever arm 52 and the block 61. Intermediate the sides 12 and 13 and fixedly mounted upon the shaft 57 are arms 56 forming part of the bell crank lever, the arms 56 carrying at their ends suitable rollers or slide bearings 58 extending into horizontal ways or slots 59 formed in the slides 15. From the foregoing it will be apparent that rotatory motion of the plate 54 is translated thru the bell crank lever into a reciprocating movement of the slides, and consequently into a vertically reciprocating movement of the table 16. The table 16 carries at its opposite ends shafts 64 and 65, upon which shafts are mounted sprockets 66 carrying endless chains 670. The upper portions of the chains are carried by rails 67 extending longitudinally of the table. The rails are supported by suitable cross-bars 68 carried by the sides 26 of the table. The sides 26 of the table and the rails are supported by a suitable cross structure comprising brackets 69 formed at the upper ends of the slides 15 and the cross piece 70 carried by the brackets 69. An intermittent motion is imparted to the shaft 65 wherefore an intermittent motion is imparted to the chains 670. This intermitting motion is accomplished by means of a transversely extending shaft 71 carried by the sides, the shaft having fixedly mounted upon it an oscillating block 72. The block 72 is pivotally connected with a plate 73 carried by the shaft 37, by means of a link 74. The block 72 has a way 75 formed in it, in which way is carried an adjustable block 76, the block 76 being pivotally connected by means of a link 77 with an arm 78 mounted on the shaft 65. The movement imparted to the link 74 by the shaft 37 is translated into an oscillating movement of the shaft 71. The shaft 71 has fixedly mounted on it a second block 79 similar to the block 72. The block 80 carried by the block 79 and similar to the block 76, is pivotally connected by means of a link 81 with an arm 82 mounted on the shaft 65. The arms 78 and 82 carry pawls 83 and 84 adapted to operate upon ratchet wheels 85 and 86 fixedly secured to the shaft 65. The ratchet wheels 85 and 86 each comprise inner wheels 87 and 88 having hubs 89 and 90 keyed to the shaft 65, and outer wheels 91 and 92 revolubly mounted upon the hubs of the inner wheels. The outer wheels 91 and 92 have elongated arcuate slots 93 and 94 thru which the bolts 95 and 96 extend. The bolts 95 and 96 are employed to adjustably secure the inner and outer wheels upon one another. The outer wheel 86 has formed in it a number of spaced notches 97 adapted to receive the pawl 84. The number of notches on the wheel 86 corresponds to the number of deposits to be made on a pan or belt that may pass below the hopper 17. Two of the notches 97 are spaced from one another at a distance in excess of the other notches 97 as shown at 98 see Fig. 1. This structure is provided to attain a skipping action of the mechanism whereby the edges of adjacent pans moving over the table may pass below the die without having a deposit made upon both pans jointly. The outer wheel 85 carried at the opposite end of the shaft 65 has but one notch as shown at 99, and into which notch the pawl 83 may enter. The pawls 83 and 84 are reciprocated simultaneously, but the arcs thru which they are moved may be varied whereby to provide a mechanism wherein the pawl 83 serves to engage in the notch 99 and to thereby revolubly actuate the shaft 65 at that time when the pawl 84 would move over but part of the space 98 between the widely spaced notches on the ratchet wheel 86. The arc of movement of the pawl 83 is such that the feed of the shaft 65 from the pawl 84 is substantially equal to the space between the evenly spaced notches 97. The sprockets 66 carried by the shaft 65 are fixedly secured to the shaft 65, wherefore motion from the shaft 65 is transmitted to the endless chains between the sprocket wheels at opposite ends of the table 16.

The chains carry suitable lugs 100 for carrying trays or the like over the table. The shaft 38 carries, externally to the side 12, a gear 101 in mesh with a gear 102 revolubly mounted on the stud 103 carried by the side 12. The gear 102 carries a post 104 which is slidably contained within an elongated slot 105 in the link 106. The link 106 has its one end pivotally mounted upon an oscillating arm 107 mounted upon the side 12. An auxiliary oscillating arm 108 is adjustable circumferentially of the arm 107 and carries at its upper end a shaft 109 extending transversely of the table. A second arm 110 similar to the auxiliary arm 108 is pivotally mounted on the side 13 and supports one end of the shaft 109. Intermediate the ends of the shaft 109 are mounted spaced fingers 111, the fingers supporting at their free ends a wire 112. The end-most fingers are provided with suitable means for retaining the ends of the wire 112, for example the hooked screw 113 which may be adjusted longitudinally of itself whereby to vary the tension of the wire 112. The fingers are retained in such position that the oscillation of the shaft 109 serves to move the wire 112 backward and forward between the die 22 and table or any pans that may be on the table. The fingers and wire may be adjusted vertically in relation to the die by means of a roller arm 114 fixedly carried by the shaft 109, and carrying a roller 115 which engages the upper edge 116 of a vertically adjustable bar 117 extending longitudinally of the table at one side thereof. The bar 117 may be adjusted vertcially by any suitable means such as by providing brackets 118 mounted upon the table revolubly supporting crank shafts 119 and 120. The crank shaft 120 carries a segment 121 having an arcuate slot 122 adapted to receive a bolt 123 carried by a bracket 1180 associated with one of the brackets 118. The crank support pivotally supports the opposite ends of the bar 117. From the foregoing it will be apparent that the bar 117 may be adjusted vertically by adjusting the segment 121 rotatably in relation to the bracket 118 and by securing the segment in its adjusted position by means of the bolt 123. The segment 121 is fixed upon the crank shaft 120. The oscillating arm is preferably revolubly mounted upon the shaft 124 extending transversely of the device and upon which shaft the auxiliary arms 108 and 110 are fixedly mounted. The relative adjustment of the arms 107 and 108 is accomplished by providing the arm 107 with an elongated arcuate slot 125 thru which a bolt 126 carried by the arm 108 extends. A spring 127 yieldingly retains the roller carried by the arm 114 in engagement upon the bar 117. A pipe 128 extends transversely of the device and is adapted to feed water to a depending canvas flap 129. The flap and the pipe may be carried by the die in any suitable manner, and water may be supplied to the pipe from any suitable reservoir. The feed of water from the pipe to the canvas flap may be accomplished in any suitable manner such as providing the pipe 128 with apertures thru which the water may seep. The flap 129 is disposed in such relation to the die and to the fingers 111 and the wire carried thereby that the wire is brought into engagement with the canvas flap after moving past the die in a given direction. As shown in Fig. 9, this movement would be from right to left. It is preferable to slit the lower portion of the canvas flap vertically in order that the canvas flap may operate upon the wire without interference from the ends of the fingers carrying the wire. In Fig. 3 is disclosed the structure whereby motion is transmitted from the transverse shaft 42 to the bell crank lever 52. The plate 54 carried by the shaft 42 carries a block 129 which may be adjusted radially of the plate 54 by means of a screw 130 engaging the block 129 and be supported by a block 131 disposed at the head of a way 132 formed between the longitudinally extending blocks 133 and 134 and in which way the block 129 may be reciprocated. The block 129 carries a stud shaft 135 on which is revolubly mounted a cap bearing 136 adapted to receive a screw 137 supporting the upper section 138 of a telescopic casing 139. The lower section 140 of the telescopic casing and the upper section 138 carry complementary screw threads whereby same may be adjusted longitudinally of one another. A spring 141 is contained within the chamber 142 formed within the casing 139. The opposite ends of the spring 141 abut the upper casing 138 and a head 143 formed on the lower end of the screw 137. The lower section 140 of the casing is revolubly mounted upon a stud shaft 144 carried by the bell crank lever 52. A suitable weight or counter-balance 145 is fixedly mounted on the shaft 57, the counter weight serving to counter balance the table, etc. The block 61 has a flange 146 extending over the edge of the side 12 and carries an adjustable screw 147 which may be employed in adjusting the limits of movement of the bell crank lever in relation to the sides, and consequently in relation to the lower limits of movement of the slides 15.

The operation of my device is as follows:

Continuous movement is imparted from the motor 49 thru the several chains or gears to the shafts 37, 38 and 42. The shafts 37 and 38 transmit movement to the dough feeding rollers by means of the double acting ratchet mechanisms operating upon the dough feed rollers 18 and 19. The rotatory motion of the shaft 42 is translated into a reciprocating motion of the slides 15 and the table 16 thru the bell crank lever 52. The die 22, due to its engagement upon the side rail of the table and the action of the spring 27, reciprocates with the table, and upon each upward movement of the table, the movement of the die in relation to the hopper causes a discharge of dough from the die to pans carried over the table by means of the endless chains 67. Immediately after the feed of dough thru the die has ceased, the oscillating arms 108 and 110 are actuated and move the wire 112 past the die thereby severing any connection between dough adhering to the die and that which has fallen upon a pan. After the wire has cut the dough, the wire engages the canvas flap and is cleaned. It should be noted that the link 106 whereby movement is transmitted to the cutting-off wire, permits the wire to remain stationary for some little time after each movement, and that the wire cutter moves in the opposite directions for each succeeding cutting-off operation. The cutting-off wire is adjusted vertically in relation to the die by adjusting the longitudinally extending bar 117 vertically of the device. After each deposit of dough, the table moves downward under the influence of the counter weight 145 together with the motion transmitted from the shaft 42 thru the bell crank lever 52. After a deposit has been made upon a pan, the endless chains 670 are moved by means of the ratchet mechanism located at one end of the table. The notches in the ratchet wheel 86 serve to equally space succeeding deposits made upon a pan, the parts being so related that when the edges of adjacent pans approach the die, the feed of the chains is made thru the ratchet wheel 85, the ratchet wheel 85 being adapted to feed the chains at a distance sufficiently great to preclude the next deposit of dough upon the edges of the pans. The sides 12 and 13 are provided with suitable rollers 148 whereby to minimize any frictional engagement or contact between the sides and the table.

What I claim is:

1. In a device of the class described the combination of a hopper, means to receive dough from the hopper and to make individual deposits thereof, means to sever the deposits from the depositing means, a perforated pipe mounted adjacent the depositing means, adapted to receive water, and a canvas flap adapted to receive water from the pipe and interposed in the path of the severing means adapted to clean the severing means of dough adhering thereto.

2. In a device of the class described the combination of a hopper, a die for receiving a plastic from the hopper and for making deposits of the plastic, and reciprocating means for thereafter severing deposits from the die, said reciprocating means moving alternately in opposite directions for succeeding severing operations.

3. In a device of the class described the combination of a reciprocating die for making plastic deposits, a reciprocating cut-off device, and means to alternately move the cut-off device in opposite directions for successive cycles of the die.

4. In a device of the class described the combination of a table, a hopper above the table, a reciprocating die for receiving a plastic from the hopper and for discharging plastic deposits on the table, means to reciprocate the die, means for severing plastic extending between the die and the deposits, and means for vertically adjusting the severing means between the die and the table.

5. In a device of the class described the combination of a table, a hopper above the table, a vertically reciprocating die for receiving a plastic from the hopper and for discharging plastic deposits on the table, means to reciprocate the die, a horizontally reciprocating cutting-off device for severing plastic extending between the die and the table, and means to actuate the cut-off device in opposite directions of each succeeding deposit.

6. In a device of the class described the combination of a table, a hopper above the table, a vertically reciprocating die for receiving a plastic from the hopper and for discharging plastic deposits on the table, means to reciprocate the die, a horizontally reciprocating cutting-off device for severing plastic extending between the die and the table, means to actuate the cut-off device in opposite directions of each succeeding deposit, and means for vertically adjusting the cutting-off device between the die and the table.

7. In a device of the class described the combination of a table, a hopper above the table, a vertically reciprocating die for receiving a plastic from the hopper and for discharging plastic deposits on the table, means to reciprocate the die, a horizontally reciprocating cutting-off device for severing plastic extending between the die and table, means to actuate the cut-off device in opposite directions of each succeeding deposit, and means for automatically cleaning the cut-off device.

8. In a device of the class described the combination of a table, a hopper above the table, a vertically reciprocating die for receiving a plastic from the hopper and for discharging plastic deposits on the table, means to reciprocate the die, a horizontally reciprocating cutting-off device for severing plastic extending between the die and the table, means to actuate the cut off device in opposite directions of each succeeding deposit, means for vertically adjusting the cutting-off device between the die and the table, and automatic cleaning means operative upon the cutting-off device.

9. In a device of the class described the combination of a table, a hopper above the table, a reciprocating die for receiving a plastic from the hopper and for discharging plastic deposits on the table, means to reciprocate the die, means for severing plastic extending between the die and the deposits, and means for cleaning the cutting-off device of plastic.

10. In a device of the class described the combination of a table, a hopper above the table, a reciprocating die for receiving a plastic from the hopper and for discharging plastic deposits on the table, means to reciprocate the die, means for severing plastic extending between the die and the deposits, means for vertically adjusting the severing means between the die and the table, and means for cleaning the cutting-off device of plastic.

In testimony whereof, I have hereunto subscribed my name this 1st day of December, 1922.

JOEL MOORES.